United States Patent Office 3,410,914
Patented Nov. 12, 1968

---

3,410,914
METHOD FOR HYDROLYZING NITRONITRITE-DINITROPARAFFIN MIXTURE
Giovannia Bonetti, Wynnewood, Pa., Chester B. De Savigny, Millington, N.J., and Conrad Michalski, Media, and Rudolph Rosenthal, Broomall, Pa., assignors to Atlantic Richfield Company, Philadelphia, Pa., a corporation of Pennsylvania
No Drawing. Continuation-in-part of application Ser. No. 347,369, Feb. 26, 1964, which is a continuation-in-part of application Ser. No. 224,731, Sept. 19, 1962. This application Jan. 17, 1967, Ser. No. 609,766
10 Claims. (Cl. 260—632)

ABSTRACT OF THE DISCLOSURE

A method for hydrolyzing a nitronitrite-dinitroparaffin mixture to the corresponding nitroalcohol and nitroolefin utilizing a catalytic amount of base and a lower aliphatic alcohol.

CROSS-REFERENCES TO RELATED APPLICATION

This application is a continuation-in-part of our co-pending application Ser. No. 347,369, filed Feb. 26, 1964, entitled, "Method for Hydrolyzing Nitronitrite-Dinitroparaffin Mixture," and now abandoned, which application in turn is a continuation-in-part of Ser. No. 224,731, filed Sept. 19, 1962, entitled "Nitrogen-Containing Derivatives of Alpha-Olefins," and now abandoned.

BACKGROUND OF THE INVENTION

Field of the invention

This invention relates to the hydrolysis of a mixture of organic nitro compounds in particular nitronitrites and dinitroparaffins to produce the corresponding nitroalcohols and nitroolefins and, more particularly, it relates to a method for hydrolyzing in a single step a mixture of the nitronitrites and dinitroparaffins produced by the nitration of straight chain alpha-olefins.

Description of the prior art

In U.S. Patent No. 3,192,248, nitration of alpha-olefins in the presence of a paraffinic hydrocarbon solvent at temperatures of from 50° C. to 150° C. is shown to give substantially quantitative yields of nitronitrites and dinitroparaffins based on the alpha-olefin charge. Heretofore, it has been thought necessary to hydrolyze the mixture of nitronitrites and dinitroparaffins in two steps in order to produce nitroalcohols from the nitronitrites and nitroolefins from the dinitroparaffins. For example, it is known that water, or a $C_1$ to $C_6$ alcohol or a mixture of such alcohol and water may be used to hydrolyze a nitronitrite to a nitroalcohol when the nitrite is in admixture with the dinitroparaffin. The nitroalcohol is then separated from the dinitroparaffin by silica gel chromatography and the dinitroparaffin may be hydrolyzed to the nitroolefin by means of an aqueous slurry of calcium oxide or magnesium oxide.

In U.S. Patent No. 3,035,101 to Seifert et al. a process is shown wherein the product resulting from the nitration of olefins can be converted to mononitroolefins by the use of tertiary amines under anhydrous conditions. It is pointed out in this patent at column 1, starting at line 34, that various methods have been proposed to prepare mononitroolefins from the nitration product resulting from the reaction of nitrogen tetroxide with an olefin. It states that U.S. Patent No. 2,495,424 shows the reaction of ammonia or urea with the crude product to form mononitroolefin. It is further stated that such process is suitable only for branched chain olefins and that the patentees, Seifert et al., have found that the yield of mononitroolefin prepared by the method of Patent No. 2,495,424 is substantially reduced rendering such process commercially impractical for the production of straight chain mononitroolefins.

SUMMARY OF THE INVENTION

The present invention is directed to a method for the hydrolysis of a mixture of nitronitrite and dinitroparaffin in a single step to produce high yields of the corresponding nitroalcohols and nitroolefins wherein the mixture of nitronitrite and dinitroparaffin is the product from the nitrogen tetroxide nitration of straight chain alpha-olefins. More particularly, the hydrolysis is carried out utilizing a lower aliphatic alcohol or a mixture of a lower aliphatic alcohol and water together with a catalytic amount of a base which is selected from the group consisting of the hydroxides of the alkali metals, the oxides and hydroxides of the Group II metals, and the salts of the alkali metals and the Group II metals which give a basic reaction in aqueous solution.

It is an object of this invention therefore to provide a process for the hydrolysis of nitronitrites and dinitroparaffins.

It is a further object of this invention to provide a process for the hydrolysis of nitronitrites and dinitroparaffins in a single step to produce, respectively, the corresponding nitroalcohols and nitroolefins.

Other objects of this invention will be apparent from the further description of the invention which follows:

As used in this specification and appended claims, the term "nitronitrites" means compounds having the formula

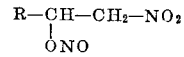

wherein R is a normal, i.e., straight chain, alkyl radical containing from 1 to 22 carbon atoms; the term "dinitroparaffins" means compounds having the formula

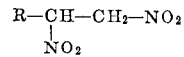

wherein R is a normal, i.e., straight chain alkyl radical containing from 1 to 22 carbon atoms; the term "nitroalcohols" means compounds having the formula

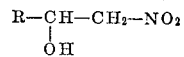

wherein R is a normal, i.e., straight chain, alkyl radical containing from 1 to 22 carbon atoms; the term "nitroolefins" means compounds having the formula

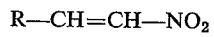

wherein R is a normal, i.e., straight chain, alkyl radical containing from 1 to 22 carbon atoms; the term "base" means hydroxides of the alkali metals, oxides and hydroxides of the Group II metals, and salts of these metals which upon hydrolysis give a basic reaction in aqueous solution, i.e. salts of strong bases and weak acids.

DESCRIPTION OF THE PREFERRED EMBODIMENTS

In accordance with this invention, the mixture of nitronitrites and dinitroparaffins obtained by the reaction of a straight chain $C_3$ to $C_{24}$ alpha-olefin with the equilibrium mixture of $NO_2$ and $N_2O_4$ is hydrolyzed by heating at a temperature in the range of from about 50° C. to 100° C. for a period of time in the range of from one minute to two hours in the presence of a hydrolyzing agent and a catalytic amount of base, i.e., 0.04 to 0.30 equivalent weight of base per mole of dinitroparaffin. Examples of suitable hydrolyzing agents are the aliphatic alcohols having from 1 to 6 carbon atoms in the molecule such as methyl alcohol, ethyl acohol, propyl alcohol, isopropyl alcohol, butyl alcohol, isobutyl acoho, t-buty alcohol, the isomeric amyl alcohols, and the isomeric hexyl alcohols, or a mixture of such an alcohol and water wherein the water ranges in amount up to about 90 percent by volume of the mixture of alcohol and water. Examples of suitable bases which may be used include the alkali metal hydroxides such as lithium hydroxide, potassium hydroxide, sodium hydroxide; the Group II metal oxides and hydroxides such as calcium oxide, barium oxide, strontium oxide, magnesium oxide, zinc oxide, calcium hydroxide, barium hydroxide; and salts of the alkali metals and alkaline earth metals which give a basic reaction in aqueous solutions, i.e., salts of a strong base and a weak acid, such as sodium acetate, potassium acetate, calcium acetate, sodium nitrite, potassium nitrite, calcium nitrite, sodium carbonate, sodium bicarbonate, potassium carbonate, potassium bicarbonate, magnesium carbonate, and calcium carbonate.

The most preferred bases are sodium hydroxide, potassium hydroxide, sodium acetate, sodium nitrite and magnesium oxide.

The minimum amount of hydrolyzing agent, alcohol or alcohol and water, required is one mole per mole of the nitronitrite-dinitroparaffin mixture. Amounts in excess of the minimum are preferred however, for example, from 3 moles to 30 moles of alcohol (or of alcohol in the alcohol-water mixture) per mole of the nitronitrite-dinitroparaffin mixture has been found to be a particularly suitable range. Although amounts greater than 30 moles may be employed no advantages have been observed for these higher amounts.

Although alcohol alone is known to be a hydrolyzing agent for nitronitrites it has been found necessary in accordance with this invention to have present a catalytic amount of base, i.e., far less than an equivalent amount, in order to hydrolyze the dinitroparaffins. Moreover, alcohol has been found to be a critical ingredient of the hydrolyzing agent, and whereas water may be used in conjunction with the alcohol, water alone together with catalytic amounts of base will hydrolyze the dinitroparaffins only to the extent of the equivalent amount of base used and not completely as with the alcohol.

In a typical nitration reaction a 56 gram (0.5 mole) sample of a straight chain alpha-olefin such as octene–1 was diluted to a volume of 500 ml. with a paraffinic hydrocarbon solvent such as 2,2,4-trimethylpentane. This solution together with an excess of an equilibrium mixture of $NO_2$ and $N_2O_4$ (for example 1.06 moles) was passed over glass beads in a reaction column at a rate of about 3.7 ml. per minute, the contact time being in the range of from 15 seconds to one minute and the temperature being maintained at 50° C. to 55° C. The solution of the reaction products was stripped free of nitrating agent with an inert gas, i.e., gaseous nitrogen and, since during the stripping operation a portion of the solvent also was evaporated, the solution was made up to 400 ml. by the addition of a sufficient quantity of 2,2,4-trimethylpentane. Analysis of the product shhowed that the nitration was substantially quantitative so that there was 0.5 mole of the mixture of 1-nitro-2-octanolnitrite and 1,2-dinitrooctane in about 1:1 weight (mole) ratio in the 400 ml. solution. Aliquot portions of such nitronitrite and dinitroparaffin solution were utilized in the hydrolysis experiments which are set forth in the following examples being provided for the purpose of further illustrating the invention.

EXAMPLE I

There was prepared as described above a 2,2,4-trimethylpentane solution of 1-nitro-2-octanolnitrite and 1,2-dinitrooctane of a concentration such that 125 ml. of the solution contained 0.125 mole of the nitronitrite and dinitrooctane mixture (i.e. 0.0625 mole of each component). This 125 ml. solution was heated to 65° C. A solution of 0.2 gram, i.e. 0.005 mole or equivalent weight, of sodium hydroxide in 125 ml. of methanol was heated to boiling and immediately added to the hot solution of 1-nitro-2-octanolnitrite and 1,2-dinitrooctane. This amount of sodium hydroxide is 0.08 equivalent weight per mole of the 1,2-dinitrooctane. After a reaction time of 6 minutes at reflux temperature, the reaction was stopped by the addition of sufficient 10 percent aqueous hydrochloric acid solution to make the reaction mixture slightly acidic. The methanol and 2,2,4-trimethylpentane were removed by evaporation and the sodium chloride was removed by filtration. Infrared analysis of the products showed that there was produced 57.5 weight percent 1-nitro-2-octanol and 26.8 weight percent 1-nitro-octene-1.

EXAMPLE II

Another 125 ml. portion of the same solution utilized in Example I (0.125 mole of a 1:1 weight ratio of 1-nitro-2-octanolnitrite and 1,2-dinitrooctane in 2,2,4-trimethylpentane) was heated to 65° C. A solution of 0.2 gram (0.08 equivalent weight per mole of the 1,2-dinitrooctane) of sodium hydroxide in 100 ml. of methanol and 25 ml. of water was heated to boiling and immediately added to the hot solution of nitronitrite and dinitrooctane. After a reaction time of 6 minutes at reflux temperature the reaction was stopped by the addition of sufficient 10 per cent aqueous hydrochloric acid solution to make the reaction mixture slightly acidic. The methanol, water and 2,2,4-trimethylpentane were removed by evaporation, and the sodium chloride was removed by filtration. Infrared analysis of the products showed that there was produced 60.3 weight percent 1-nitro-2-octanol and 24.8 weight percent 1-nitro-octene-1.

EXAMPLE III

To 50 ml. of a solution containing 0.0625 mole of 1-nitro-2-octanolnitrite and 1,2-dinitrooctane mixture in about a 1:1 weight ratio with the remainder of the solution being 2,2,4-trimethylpentane was added 35 ml. of 2,2,4-trimethylpentane and 60 ml. of methanol. This solution was heated to refluxing temperature (about 65° C.) and 15 ml. of 1 percent aqueous solution of potassium hydroxide (0.0025 mole potassium hydroxide, 0.08 equivalent weight of KOH per mole of the 1,2-dinitrooctane) was added to the refluxing solution. The refluxing was continued for 15 minutes and thereafter the reaction was stopped by the addition of sufficient 10 percent aqueous hydrochloric acid solution to make the reaction mixture slightly acidic. The product mixture was extracted with about 100 ml. of diethyl ether and the ether extract was washed with about 50 ml. of water. Upon evaporation of the 2,2,4-trimethylpentane and ether, infrared analysis of the products showed that there was produced 55.0 weight per cent 1-nitro-2-octanol and 31.9 weight percent 1-nitrooctene-1.

EXAMPLE IV

To another 50 ml. aliquot portion of the solution utilized in Example III was added 35 ml. of 2,2,4-trimethylpentane and 60 ml. of methanol. This solution was heated to refluxing temperature and to the refluxing solution was added 15 ml. of a 1 percent aqueous slurry of magnesium oxide. This amounted to 0.00375 mole or 0.0075 equivalent weight of MgO which in turn was 0.24 equivalent weight per mole of the 1,2-dinitrooctane. The refluxing was continued for 15 minutes and thereafter the reaction was stopped by the addition of sufficient 10 percent aqueous hydrochloric acid solution to make the reaction mixture slightly acidic. The product mixture was extracted with about 100 ml. of diethyl ether and the ether extract was washed with about 50 ml. of water. Upon evaporation of the 2,2,4-trimethylpentane and ether, infrared analysis of the products showed that there was produced 56.4 weight percent 1-nitro-2-octanol and 30.4 weight percent 1-nitrooctene-1.

EXAMPLE V

An experiment was run identical to that of Example IV except that 15 ml. of barium hydroxide in water (0.0025 mole barium hydroxide or 0.005 equivalent weight which amounted to 0.16 equivalent weight per mole of the 1,2-dinitrooctane) was added to the refluxing solution instead of the magnesium oxide. The analysis of the products showed that there was produced 56.5 wieght percent 1-nitro-2-octanol and 28.6 weight percent 1-nitroctene-1.

EXAMPLE VI

An experiment identical with those in Examples IV and V was carried out except that 15 ml. of a slurry of 1 percent zinc oxide in water (0.00185 mole of zinc oxide or 0.12 equivalent weight of zinc oxide per mole of the 1,2-dinitrooctane) was added to the refluxing solution instead of the magnesium oxide or barium hydroxide. The product analyzed 54.4 weight percent 1-nitro-2-octanol and 23.0 weight percent 1-nitrooctene-1.

EXAMPLE VII

There was prepared as has been described a 2,2,4-trimethylpentane solution of 1-nitro-2-octanolnitrite and 1,2-dinitrooctane in which the concentration of nitronitrite and dinitrooctane was 0.125 mole per 100 ml. of solution. A 100 ml. sample of this solution was heated to 60° C. A solution of 0.4 gram of sodium acetate trihydrate (0.048 equivalent weight per mole of the dinitrooctane) in 80 ml. of methanol and 20 ml. of water was heated to boiling and immediately added to the hot solution of 1-nitro-2-octanol nitrite and 1,2-dinitrooctane. After a reaction time of 15 minutes at reflux temperature, the methanol, water and 2,2,4-trimethylpentane were removed by evaporation and the sodium acetate was removed by filtration. Infrared analysis of the products showed that there was produced 58.0 weight percent 1-nitro-2-octanol and 27.3 weight percent of 1-nitrooctene-1.

EXAMPLE VIII

A 50 ml. solution containing 29.7 grams (0.146 mole) of a mixture of 1-nitro-2-octanolnitrite and 1,2-dinitritooctane, with about a 1:1 weight ratio with the remainder of the solution being 2,2,4-trimethylpentane, was heated to 86° C. with stirring in a nitrogen stream. A solution of 4 grams of sodium acetate trihydrate (0.0294 mole, 0.4 equivalent weight per mole of 1,2-dinitrooctane) in 18 ml. of water was added to the heated solution. A sample taken after 93 minutes of reaction showed that dinitrooctane was still present in the reaction mixture, however, the amount of 1-nitrooctene-1 produced was equivalent to the amount of sodium acetate employed. This demonstrates that the reaction is noncatalytic when water alone is used in the absence of an alcohol as an ingredient of the hydrolyzing agent.

Another 50 ml. portion of the same solution containing 0.146 mole of the nitronitrite-dinitrooctane mixture was heated to 72° C. with stirring in a nitrogen stream. A solution of 4 grams of sodium acetate trihydrate in 50 ml. of water was added and the mixture heated to 83° C. After 19 minutes of reaction a sample of the product showed that incomplete conversion of the dinitrooctane to the nitrooctene had taken place. Upon addition of 100 ml. of methanol to the reaction mixture and with stirring for 10 minutes at 65° C., analysis showed that complete conversion of the dinitrooctane to nitrooctene had taken place. This experiment gives further proof that the reaction is catalytic only in the presence of alcohol as a part of the hydrolyzing agent.

EXAMPLE IX

To 45 ml. of a solution containing 0.0312 mole of a mixture of 1-nitro-2-octanolnitrite and 1,2-dinitrooctane in about a 1:1 weight ratio with the remainder of the solution being 2,2,4-trimethylpentane was added 32 ml. of methanol and the solution refluxed. To the refluxing solution was added 8 ml. of 1 percent sodium nitrite in water (0.00116 mole sodium nitrite, 0.0744 equivalent weight per mole of the 1,2-dinitrooctane) and the refluxing was continued for 15 minutes. The reaction was terminated by the addition of sufficient 10 percent aqueous hydrochloric acid solution to make the reaction mixture slightly acidic. The product mixture was extracted with diethyl ether and the ether extract washed with water and thereafter the 2,2,4-trimethylpentane and ether were evaporated. An analysis of the product showed that both 1-nitro-2-octanol and 1-nitrooctene-1 were produced and that the 1,2-dinitrooctane was consumed in the reaction.

EXAMPLE X

An experiment was carried out identical with that of Example IX except that instead of adding 8 ml. of 1 percent sodium nitrite to the refluxing solution there was added 8 ml. of 1 percent sodium sulfate (0.00056 mole sodium sulfate, 0.072 equivalent weight per mole of the dinitrooctane). Infrared analysis showed that only a trace of 1-nitrooctene-1 had been produced and that the 1,2-dinitrooctane had not been consumed. This experiment in comparison with Example IX demonstrates that it is necessary to employ as the catalyzing base the salt of a strong base and a weak acid which in water will give a basic reaction.

EXAMPLE XI

An experiment was carried out identical with Example VII except that instead of adding a solution of sodium acetate trihydrate to the hot solution of 1-nitro-2-octanolnitrite and 1,2-dinitrooctane mixture there was added a solution of 3.3 grams (0.48 equivalent weight per mole of dinitrooctane) of $Al_2(SO_4)_3 \cdot 18H_2O$ in 80 ml. of methanol and 20 ml. of water. Infrared analysis after 80 minutes of reaction showed that no 1-nitrooctene-1 had been produced.

EXAMPLE XII

A 50 ml. sample of a solution containing 14.8 grams (0.0725 mole) of 1-nitro-2-octanolnitrite and 1,2-dinitrooctane in a 1:1 weight ratio with the remainder of the solution being 2,2,4-trimethylpentane was heated to 75° C. in a stream of nitrogen. To this solution was added a mixture of 1 gram of sodium acetate trihydrate (0.00735 mole, 0.2 equivalent weight per mole of the 1,2-dinitrooctane), 20 ml. of water and 90 ml. of tertiary butanol. After 15 minutes of heating at 73° C.–76° C. the product mixture was filtered and the water and tertiary butanol evaporated from the products. Infrared analysis showed that there was produced 55.2 weight percent 1-nitrooctanol-2 and 31.5 weight percent 1-nitrooctene-1.

EXAMPLE XIII

In order to demonstrate the superiority of the instant process for the hydrolysis of straight chain nitronitrites and dinitroparaffins a reaction was carried out in accordance with the prior art disclosures as exemplified by Example VI of the aforementioned patent to Scaife et al., No. 2,495,424, except that octene-1 was utilized as the straight chain olefin starting material instead of the branched chain olefin, 2,4,4-trimethylpentene-1, utilized in the patent. A 6.6 gram sample of octene-1 in dioxane was treated with $NO_2$–$N_2O_4$ to produce the mixture of 1,2-dinitrooctene and 1-nitro-2-octanolnitrite. This mixture was reacted with 5.3 grams of urea at room temperature for 15 minutes with stirring and then the entire mixture was heated to 100° C. with reflux for 4 hours. The dioxane was separated and 7.8 grams of a dark red, viscous product was isolated. This product analyzed 6.1 percent 1-nitrooctene-1. This amounted to an overall yield of 5.1 percent nitroolefin. The patent shows a yield of 77.2 percent nitroolefin when a branched chain olefin was employed as the starting material and consequently such prior art processes give very inferior results with straight chain compounds.

In order to further check these results a second run was carried out in accordance with Example III of the Scaife et al. patent utilizing the nitration product of octene-1 instead of the nitration product of 2,2,4-trimethylpentene-1. Dry ammonia gas was bubbled into the octene-1 nitration mixture and there was obtained only about a 5 percent yield of the nitroolefin in contrast to the 79.7 percent yield obtained by Scaife et al. with the branched chain olefin starting material. This second run also shows that the prior art hydrolysis methods are completely inferior to the process of the instant invention when straight chain compounds are being treated.

EXAMPLE XIV

In order to demonstrate that only catalytic amounts of base should be employed in accordance with the instant invention several runs were carried out using various amounts of the catalytic base. All of the runs were carried out under the same conditions. To 40 ml. of a 2,2,4-trimethylpentane solution containing 14.6 grams (0.0716 mole) of 1,2-dinitrooctane, and 1-nitro-2-octanolnitrite (produced from octene-1) heated to 65° C. was added a solution of sodium hydroxide in 35 ml. of methanol 5 grams of water previously heated to boiling. Refluxing was continued for 6 minutes and the product was acidified with dilute hydrochloric acid, evaporated under reduced pressure to remove the methanol and 2,2,4-trimethylpentane, taken up in ether, the lower aqueous layer removed and the ether layer evaporated under reduced pressure. The residue was then analyzed by infrared for 1-nitrooctanol-2 and 1-nitrooctene-1.

The quantities of catalyst employed and the results obtained are set forth in the table.

| Equivalent weights of NaOH per mole of 1,2-dinitrooctane | Weight percent nitroalcohol | Weight percent nitroolefin | Total, Weight percent |
|---|---|---|---|
| 0.08 | 51.5 | 36.4 | 87.9 |
| 0.16 | 49.5 | 38.2 | 87.7 |
| 0.30 | 48.0 | 34.7 | 82.7 |
| 0.40 | 45.7 | 29.7 | 75.4 |
| 0.80 | 39.5 | 24.4 | 63.9 |

These results show that the range of 0.04 to 0.30 equivalent weights of base per mole of dinitroparaffin give the superior yields in accordance with the objects of this invention. It will be understood that "equivalent weights" as used herein has the usual meaning, thus an equivalent weight of an alkali metal hydroxide is equal to 1 mole and an equivalent weight of a Group 11 metal oxide or hydroxide is equal to ½ mole of such compound.

The mixture of nitroalcohol and nitroolefin prepared in accordance with this invention may be separated into its components by conventional silica gel chromatography, e.g., a column of silica gel three feet deep and one inch in diameter was wetted with 250 ml. of 2,2,4-trimethylpentane. A 7.65 gram mixture of 1-nitro-2-octanol and 1-nitrooctene-1 prepared in accordance with the methods set forth in the foregoing examples was dissolved in 50 ml. of 2,2,4-trimethylpentane and adsorbed onto the silica gel in the column. Upon passage of 500 ml. of a 50:50 mixture by volume of carbon tetrachloride and benzene through the column and evaporation of the solvents there was recovered 2.2 grams of 1-nitrooctene-1 which was identified by infrared analysis. Upon subsequent passage of 250 ml. of diethyl ether through the column and evaporation of the ether there was recovered 4.23 grams of 1-nitro-2-octanol which was identified by infrared analysis.

The nitroalcohols and nitroolefins prepared in accordance with this invention are useful both as chemical intermediates and in the production of other useful products by methods well known in the art, e.g., anionic detergents may be prepared from the nitroalcohols by sulfation and non-ionic detergents may be prepared from the nitroalcohols by condensing the alcohols with an alkylene oxide such as ethylene oxide or by esterifying with a polyalkylene glycol. The nitroalcohols are also useful as solvents and plasticizers, particularly for nitrocellulose. The nitrolefins are particularly useful in the production of polymeric materials and they also may be converted into useful detergents by recation with sodium bisulfite.

We claim:

1. A method for hydrolyzing a mixture of a nitronitrite and a dinitroparaffin produced by the nitration of the corresponding straight chain alpha-olefin, said nitronitrite having the formula

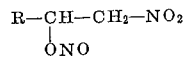

and said dinitroparaffin having the formula

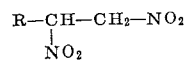

wherein R is a normal alkyl radical containing from 1 to 22 carbon atoms to produce respectively the corresponding nitroalcohol from the nitronitrite and the corresponding nitroolefin from the dinitroparaffin which comprises contacting a mixture of said nitronitrite and dinitroparaffin with from 0.04 equivalent weight to 0.30 equivalent weight per mole of dinitroparaffin of a base selected from the group consisting of the hydroxides of the alkali metals, the oxides and hydroxides of the Group II metals, and salts of the alkali metals and the Group II metals which give a basic reaction in aqueous solution and with a hydrolyzing agent selected from the group consisting of aliphatic alkanols having from 1 to 6 carbon atoms in the molecule and a mixture of a said alkanol and water wherein the water ranges in an amount up to about 90 per cent by volume of said alkanol-water mixture, said hydrolyzing agent being in an amount of at least 1 mole per mole of the nitronitrite-dinitroparaffin mixture, said contacting being at a temperature in the range of from 50° C. to 100° C. for a period in the range of from one minute to two hours and thereafter recovering the nitroalcohol and nitroolefin.

2. The method according to claim 1 wherein the hydrolyzing agent is methanol.

3. The method according to claim 1 wherein the hydrolyzing agent is a mixture of methanol and water wherein the water ranges in amount up to about 90 per cent by volume of the methanol-water mixture.

4. The method according to claim 1 wherein the hydrolyzing agent is tertiary butanol.

5. The method according to claim 1 wherein the base is sodium hydroxide.

6. The method according to claim 1 wherein the base is potassium hydroxide.

7. The method according to claim 1 wherein the base is a slurry of magnesium oxide in water.

8. The method according to claim 1 wherein the base is a slurry of zinc oxide in water.

9. The method according to claim 1 wherein the base is barium hydroxide in water.

10. The method according to claim 1 wherein the base is an aqueous solution of sodium acetate.

References Cited

UNITED STATES PATENTS

| | | | |
|---|---|---|---|
| 1,459,410 | 6/1923 | Moran. | |
| 2,384,050 | 9/1945 | Smith et al. | 260—644 |
| 2,417,380 | 3/1947 | Smith et al. | 260—644 |
| 2,472,550 | 6/1949 | Smith et al. | 260—632 |
| 2,495,424 | 1/1950 | Scaife et al. | 260—644 |
| 3,192,271 | 6/1965 | Ponetti et al. | 260—632 |
| 3,240,823 | 3/1966 | Ponetti et al. | 260—644 |

FOREIGN PATENTS 936,403  2/1948  France.

OTHER REFERENCES

Topchier: "Nitration of Hydrocarbons" (1959), pp. 226–232.

LEON ZITVER, *Primary Examiner.*

J. E. EVANS, *Assistant Examiner.*